United States Patent Office 2,835,669
Patented May 20, 1958

2,835,669

PROCESS FOR THE PRODUCTION OF SUBSTITUTED MORPHOLINES

Otto Thoma, Ingelheim am Rhine, Germany, assignor to C. H. Boehringer Sohn, Ingelheim am Rhine, Germany, a partnership No Drawing. Application June 29, 1953
Serial No. 364,929

Claims priority, application Germany July 1, 1952

8 Claims. (Cl. 260—247)

The present invention relates to a process for the production of substituted morpholines.

Processes for the production of morpholine derivatives are already known, whereby diethanolamines were treated e. g. by heating to temperatures to 160–180° C. with 70% sulphuric acid, in order to cause morpholine ring closure.

However, it is particularly necessary when producing substituted morpholines, to find specially mild reaction conditions for the ring closure. In this case there exists namely, the danger of undesired side reactions, which can be brought about by the influence of the temperature or the acids employed for the ring closure.

The object of the present invention is therefore a process, according to which the ring closure leading to morpholine derivatives can be carried out under particularly mild reaction conditions, e. g. without additional heating or with only slight heating. In U. S. Letters Patent 2,566,097 a process is described according to which when the substituted diethanolamine is allowed to stand in solution, ring closure already takes place. However, such an easy ring closure is only limited to very definite individual cases, whereas generally vigorous conditions are necessary.

It has now surprisingly been found that a certain group of substituted diethanolamines of the general formula

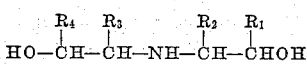

wherein $R_1$ is a phenyl residue, which if desired can be substituted by a hydroxyl group or a low molecular alkyl or alkoxy residue, $R_2$ and $R_3$ are hydrogen atoms or phenyl- or alkyl residues and $R_4$ is a hydrogen atom or a phenyl residue, can be subjected to the morpholine ring closure under particularly mild conditions and without disturbing side-reactions.

Therefore, the present invention relates to a process for the production of substituted morpholines of the general formula

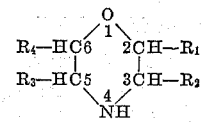

wherein $R_1$ to $R_4$ have the above-named meanings. According to the invention the substituted morpholines of the said general formula are produced by introducing substituted diethanolamines of the general formula

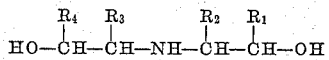

wherein $R_1$ to $R_4$ have the above definitions, without heating into concentrated (96%) sulphuric acid or by treating them with diluted acids at moderate temperatures.

If the ring closure is effected with concentrated sulphuric acid without heating, then, using the free base as starting material it will be convenient to work under good cooling conditions in order to dissipate the heat of neutralization. However, one can also start from a salt of the base, which can be introduced into the concentrated sulphuric acid without cooling. The desired morpholine derivative is formed after several hours standing and can be worked up in the usual manner, e. g. by pouring on ice, making alkaline and extracting with ether and purifying the morpholine by crystallization or distillation.

When working with diluted acids the reaction proceeds, as already mentioned above, likewise under relatively mild conditions. In many cases it is sufficient to operate at room temperature. With other derivatives gentle warming or heating to waterbath temperature with an aqueous or alcoholic acid is necessary. This probably depends on the type of substituents. The actual reaction conditions can easily be ascertained by simple preliminary tests. As dilute acids, which may be used in the process according to the invention there may be mentioned by way of example: sulphuric acid, hydrobromic acid, hydrochloric acid, etc.

The substituted diethanolamines used as starting material can be prepared by any suitable method. It has, however, been found preferable, to produce these substituted diethanolamines in the following manner: Benzylanolamine is reacted with a suitable halogenated ketone and the reaction product is subjected to catalytic hydrogenation so that the benzyl residue is split off and the keto group is simultaneously reduced to a carbinol group. These reactions may be illustrated by the following reaction equation:

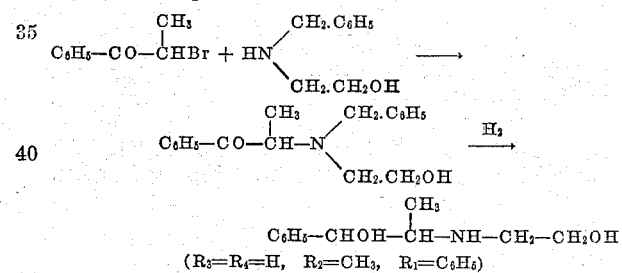

($R_3$=$R_4$=H, $R_2$=$CH_3$, $R_1$=$C_6H_5$)

The morpholines produced according to the invention are valuable pharmaceuticals or intermediate products for the production of pharmaceuticals. The pharmacological behavior of the compounds obtained according to the present invention, will be more fully described by the example of one of the compounds of this class, the 2-phenyl-3-methyl-morpholine. The most important effect of said substance appears when compared with amphetamine, to which it is superior inasmuch as it causes the particularly desired effect of deferring the tiring whilst being less poisonous and less stimulating.

2-phenyl-3-methyl-morpholine

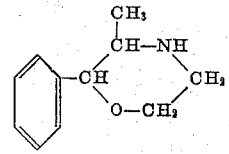

Amphetamine,

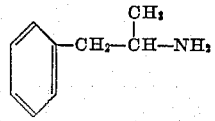

*Toxicity.*—With white mice the LD 50 is 200 mg./kg., when subcutaneously injected, the corresponding value for amphetamine is 75 mg./kg. When perorally administerated the LD 50 with white mice is 475 mg./kg., with amphetamine it is 95 mg./kg. When injected intraperitoneally the LD 50 with white mice is 200 mg./kg., and with amphetamine it is 50 mg./kg.

The stimulating effect on mice and rats, measured by the increase in motility, is approximately 7 to 10 times lower than that of amphetamine.

Effect on blood pressure is about 1000–1500 times lower than that of adrenaline.

*Effect on blood sugar level.* — The 2-phenyl-3-methyl-morpholine, when intramuscularly injected in dosages of 1.5 to 10 mg./kg., does not alter the blood sugar level of dogs. Said substance does also not influence the elevation of the blood sugar level by glucose per os. It has been found that the contraction of the nictitating membrane in the cat "Katzennickhaut" after administration of 2-phenyl-3-methylmorpholine is reduced respectively annulled by cocaine and denervation. In this case too, the substance principally behaves like amphetamine.

When administrated to human beings, dosages up to 25 mg. will not cause any disadvantageous effects, but will cause a notable deferring of tiring. Said dosages of the substance will not cause excitation, as does the amphetamine, nor will cause abrupt mental processes; on the contrary, an excellent ability of mental concentration will be experienced after administration of the substance. When administrated in larger dosages and parenterally stimulation can be caused as after administration of amphetamine; this stimulation however will not be accompanied by a corresponding increase in blood pressure. The other compounds of this class will produce similar effects.

The following examples will more clearly explain the invention, without limiting it.

EXAMPLE 1

2-phenylmorpholine 10 g. of β-phenyl-β,β'-dihydroxy-diethylamine-hydrochloride are dissolved in 15 ccs. of concentrated sulphuric acid and left to stand overnight at room temperature. It is then poured onto ice, made alkaline with caustic soda solution and the base taken up in ether. After drying, the ether residue is fractionally distilled. The 2-phenylmorpholine distills at 145° C. and 14 mm. Yield 83%. The hydrochloride is obtained with alcoholic hydrochloric acid and acetone, M. P.=151° C.

EXAMPLE 2

2-phenyl-3-methylmorpholine

According to the same procedure as in Example 1, 2-phenyl-3-methyl-morpholine is obtained in a 92% yield from β-phenyl-α-methyl-β,β'-dihydroxy-diethylaminehydrochloride. The base is a liquid, K. P.$_{12}$=138° C. The hydrochlorid crystallizes from alcoholic hydrochloric acid and acetone, M. P.=182° C.

EXAMPLE 3

2,3-diphenylmorpholine 10 g. of α,β-diphenyl-β,β'-dihydroxy-diethylamine-hydrochloride are dissolved in 15 ccs. of concentrated sulphuric acid and left to stand overnight at room temperature. The viscous solution is poured on ice and made alkaline with concentrated ammonia, and the 2,3-diphenylmorpholine precipitates in crystalline form, M. P.=91° C. Further purification follows by means of the hydrochloride, which on treatment with alcoholic hydrochloric acid and acetone, crystallizes. M. P.=265° C., yield 67%.

EXAMPLE 4

2,6-diphenylmorpholine 10 g. of β,β-diphenyl-β,β'-dihydroxy-diethylamine-hydrochloride dissolved in 15 ccs. of concentrated sulphuric acid are allowed to stand overnight at room temperature. After pouring on ice, it is made alkaline with ammonia. The base precipitates as a tough, sticky mass, which is taken up in chloroform. The chloroform residue, when triturated with ether, produces the crystalline base with M. P.=108° C. The hydrochloride is obtained with alcoholic hydrochloric acid and acetone. M. P.=ca. 200° C. (dec.). Yield 65%.

EXAMPLE 5

2-phenyl-3-ethylmorpholine 1-phenyl-1-keto-2-bromobutane is reacted with benzyl ethanol-amine. The resulting 1-phenyl-1-hydroxy-2-ethanolaminobutane was obtained as the hydrochloride of M. P.=147° C. (dec.). The base recrystallized from benzene melts at 27° C., the bioxalate which is easily soluble in alcohol at 90° C.

1 g. of the base was dissolved in 1.5 ccs. of concentrated sulphuric acid, the temperature rising to ca. 40° C. on account of the heat of neutralization. After standing overnight it was poured on ice, made alkaline, shaken out with ether and the 2-phenyl-3-ethylmorpholine-bioxalate was obtained as crystals of M. P.=165° C. which are difficulty soluble in alcohol.

EXAMPLE 6

2-(p-tolyl)-morpholine 67 g. of p-methyl-acetophenone in 500 ccs. of benzene are slowly treated with 25 ccs. of bromine and the benzene distilled off after standing for a while. The residue is treated with 150 g. of benzylethanolamine in 150 ccs. of benzene, care being taken that the temperature does not exceed 55° C. Benzylethanolaminehydrobromide crystallizes out, which is filtered off the next day by suction and washed with benzene. The benzene solution is shaken 2 or 3 times with water, dried over sodiumsulphate and the benzene distilled off. The residue crystallizes with alcoholic hydrochloric acid. It is filtered off with suction and washed with acetone. The reaction product 1-(p-tolyl)-1-keto-2-benzyl-ethanolaminoethane is obtained in a 60% yield, M. P.=171° C.

100 g. of this product are hydrogenated in 1 litre of methanol in the presence of 30 ccs. of 2% palladium-chloride solution and charcoal. When 2 mols of hydrogen have been absorbed, the reaction ceases. The catalyst is filtered off with suction, the methanol is removed by distillation and the residue, 1-(p-tolyl)-1-hydroxy-2-ethanolaminoethane, is heated with 700 ccs. of 30% sulphuric acid on a water bath in an open flask. It is allowed to cool, diluted with 700 ccs. of water, made alkaline with caustic soda solution. It is then shaken three times with ether, the ethereal solution is dried and the ether evaporated. The residue produces crystals of 2-(p-tolyl)-morpholine-hydrochloride with alcoholic hydrochloric acid, which are filtered off with suction and washed with acetone. M. P.=181° C. Yield=73% of theory.

EXAMPLE 7

3-phenyl-2-(p-methoxyphenyl)-morpholine 50 g. of 2-phenyl-1-hydroxy-1-(p-methoxyphenyl)-2-ethanolaminoethane-hydrochloride, produced by hydrogenation in the presence of palladium of 2-phenyl-1-keto-1 - (p - methoxyphenyl) - 2 - benzyl - ethanol - aminoethane-hydrochloride obtained from 2-phenyl-1-keto-1-(p-methoxyphenyl)-2-bromoethane by reacting with benzylethanolamine, are boiled with 500 ccs. of 5% hydrochloric acid for two hours, after cooling, made alkaline with caustic soda solution, the base taken up in chloroform and the chloroform distilled. The residue when treated with alcoholic hydrochlorid acid produces the hydrochloride of 3-phenyl-2-(p-methoxyphenyl)-morpholine of M. P.=238° C.

EXAMPLE 8
2-phenyl-3-methyl-morpholine 10 g. of β - phenyl - α - methyl - β,β' - dihydroxy - diethylamine-hydrochlorid, produced by hydrogenation in the presence of palladium and charcoal of β-phenyl-α-methyl - β - keto - β' - hydroxy - N - benzyl - diethylamine-hydrochloride obtained from bromo-propiophenone by reacting with benzyl-ethanolamine, are warmed with 10% hydrochlorich acid for 6 hours on a water bath. After working up in the usual manner, the hydrochloride of the 2-phenyl-3-methyl-morpholine crystallizes out from methanolic hydrochloric acid and acetone, M. P.=182° C.

EXAMPLE 9
2,6-diphenyl-3,5-dimethyl-morpholine 2 mol equivalents of 1-phenyl-1-keto-2-bromo-propane-yield when reacted with 1 mol equivalent benzylamine, N - benzyl - β,β' - diphenyl - β,β' - diketo - α,α' - dimethyl-diethylamine, which when hydrogenated catalytically yields β,β'-diphenyl-β,β'-dihydroxy-α,α'-dimethyl-diethylamine.

1 g. of this product is dissolved in 1.5 ccm. of concentrated sulfuric acid and worked up in the usual manner after standing over night at room temperature. 2,6-diphenyl-3,5-dimethylmorpholine is obtained. M. P. =147° C.

What I claim is:

1. A morpholine compound selected from the group consisting of a morpholine compound of the formula

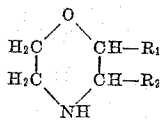

wherein $R_1$ is a member selected from the group consisting of phenyl, hydroxy phenyl, lower alkyl phenyl, and lower alkoxy phenyl, and $R_2$ is a member selected from the group consisting of phenyl and lower alkyl, and its addition salts.

2. An acid addition salt of 2-phenyl-3-methyl morpholine.

3. The hydochloride of 2-phenyl-3-methyl morpholine.

4. As a new compound 2-phenyl-3-methylmorpholine.

5. In a process of producing substituted morpholine compounds of the formula

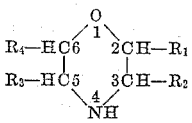

wherein $R_1$ is a member selected from the group consisting of phenyl, hydroxy phenyl, lower alkyl phenyl, and lower alkoxy phenyl, $R_2$ and $R_3$ are members selected from the group consisting of hydrogen, phenyl, and alkyl, and $R_4$ is a member selected from the group consisting of hydrogen and phenyl, the steps comprising mixing a diethanolamine compound selected from the group consisting of a diethanolamine of the formula

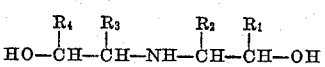

wherein $R_1$, $R_2$, $R_3$, and $R_4$ indicate the same members as stated above, and its acid addition salts, with concentrated sulfuric acid, and allowing the reaction mixture to stand until ring closure to the morpholine compound of said formula is complete, without the application of heat during such ring closure reaction.

6. In a process of producing substituted morpholine compounds of the formula

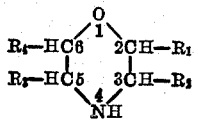

wherein $R_1$ is a member selected from the group consisting of phenyl, hydroxy phenyl, lower alkyl phenyl, and lower alkoxy phenyl, $R_2$ and $R_3$ are members selected from the group consisting of hydrogen, phenyl, and alkyl, and $R_4$ is a member selected from the group consisting of hydrogen and phenyl, the steps comprising mixing a diethanolamine base of the formula

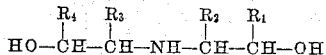

wherein $R_1$, $R_2$, $R_3$, and $R_4$ indicate the same members as stated above, with cold concentrated sulfuric acid while cooling and allowing the reaction mixture to stand until ring closure to the morpholine compound of said formula is complete, without the application of heat during such ring closure reaction.

7. In a process of producing substituted morpholine compounds of the formula

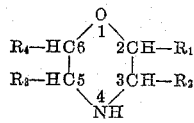

wherein $R_1$ is a member selected from the group consisting of phenyl, hydroxy phenyl, lower alkyl phenyl, and lower alkoxy phenyl, $R_2$ and $R_3$ are members selected from the group consisting of hydrogen, phenyl, and alkyl, and $R_4$ is a member selected from the group consisting of hydrogen and phenyl, the steps comprising mixing an acid addition salt of a diethanolamine base of the formula

wherein, $R_1$, $R_2$, $R_3$, and $R_4$ indicate the same members as stated above, with cold concentrated sulfuric acid and allowing the reaction mixture to stand until ring closure to the morpholine compound of the said formula is complete, without the application of heat during such ring closure reaction.

8. In a process of producing a diethanolamine compound of the formula

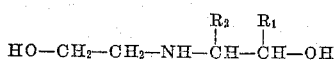

wherein $R_1$ is a member selected from the group consisting of phenyl, hydroxy phenyl, lower alkyl phenyl, and lower alkoxy phenyl, and $R_2$ is a member selected from the group consisting of hydrogen, phenyl, and alkyl, the steps comprising reacting benzyl ethanolamine with a halogenated ketone of the formula

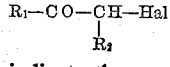

wherein $R_1$ and $R_2$ indicate the same members as stated above and Hal is halogen, and catalytically hydrogenating the resulting reaction product to split off the benzyl radical and to convert the keto group into a secondary alcohol group.

References Cited in the file of this patent
UNITED STATES PATENTS

| Number | Name | Date |
|---|---|---|
| 615,488 | Knorr | Dec. 6, 1898 |
| 1,923,179 | Ulrich et al. | Aug. 22, 1933 |
| 2,566,097 | Thoma | Aug. 28, 1951 |

OTHER REFERENCES

Emerson: Chem. Abstracts, vol. 39, page 2496 (1945).
Medard: Chem. Abstracts, vol. 30, page 7578 (1936).
Gilman et al.: J. A. C. S., vol. 73, pages 4030–31 (1951).
Spitzbarth et al.: Klinische Wochenschrift, vol. 31, pp. 806–08 (1953).